Nov. 19, 1968   S. V. DILLON   3,411,814
PIPE COUPLING

Filed Feb. 11, 1966   2 Sheets-Sheet 1

INVENTOR.
STEPHEN V. DILLON

BY  *Head & Johnson*

ATTORNEYS

Nov. 19, 1968    S. V. DILLON    3,411,814
PIPE COUPLING

Filed Feb. 11, 1966    2 Sheets-Sheet 2

INVENTOR.
STEPHEN V. DILLON

BY

Head & Johnson

ATTORNEYS

# United States Patent Office 3,411,814
Patented Nov. 19, 1968

3,411,814
PIPE COUPLING
Stephen V. Dillon, 2256 S. Troost Ave.,
Tulsa, Okla. 74114
Filed Feb. 11, 1966, Ser. No. 526,803
5 Claims. (Cl. 285—340)

ABSTRACT OF THE DISCLOSURE

This invention relates to a pipe coupling and has for its object the provision of a quick-action coupling for retaining adjacent abutting ends of plain pipe, tubing, hose connections or rod members and further providing a means for releasing the pipe from the coupling without special tools or instruments.

BACKGROUND AND SUMMARY OF INVENTION

It is desirable in many fluid flow systems to provide a means for making a quick connection between abutting ends of pipe or tubing. A typical example is in the irrigation art where it is desirable to move, relocate and recombine tubing at various desired times and positions without undue interruption for making and breaking couplings between the pipes, tubing or rods. Other examples include valves and the metering of fluids and other domestic uses.

Accordingly, this invention relates to and provides a quick-action coupling member wherein bare ended pipe is retained within a coupling, including a circumferential seal by a gripping ring which is caused to cant obliquely to the pipe gripping same and preventing the pipe from being pulled from the coupling. In another position the canted ring may be oriented coaxially with the pipe and allow immediate release therefrom. Other objects can best be understood by reference to the following specification and claims when taken in conjunction with the following illustrations of which:

Figure 1:
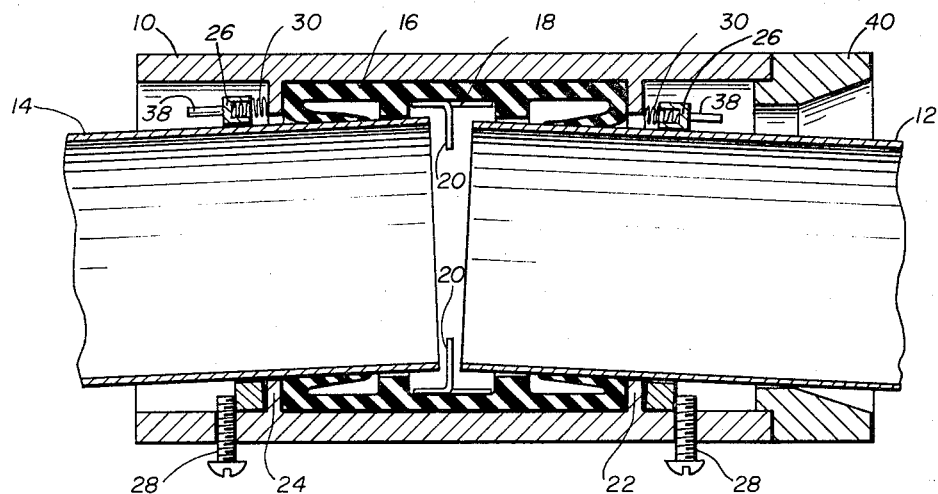
FIGURE 1 is a sectional view of the pipe coupling of this invention.
Figure 2:
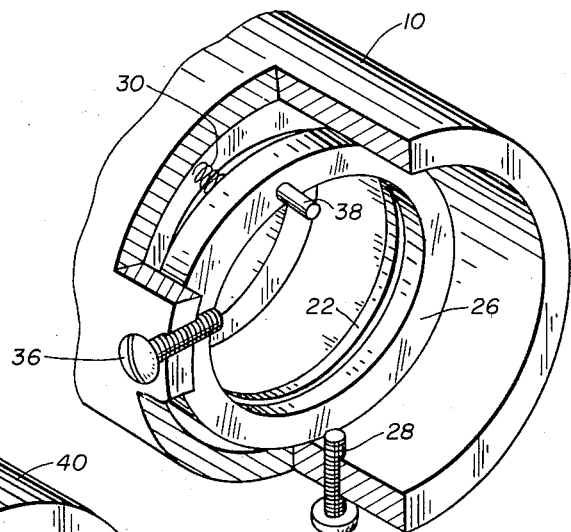
FIGURE 2 is a perspective, partially cut away end view of the coupling means of this invention as shown in FIGURE 1.
Figure 3:
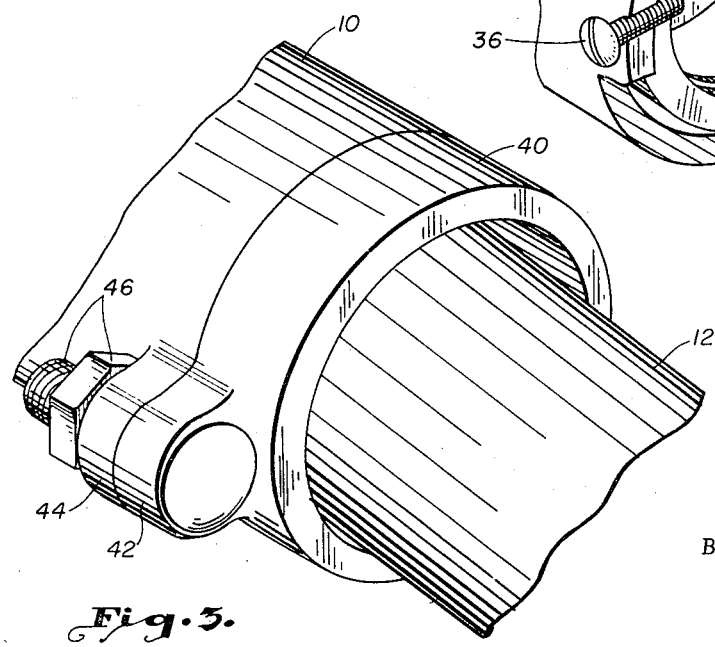
FIGURE 3 is a perspective partial view of the assembled tubing end coupling.

Generally speaking, the invention relates to a pipe coupling including a cylindrical housing 10 which has an axial opening therethrough to receive adjacent ends of pipe or tubing 12 and 14 respectively. Interiorly of the housing is a resilient, such as rubber, seal member 16 which includes at least one pipe stop or limit member 18 to prevent the pipe from advancing axially more than a desired length within the housing. Although pipe limit members 18 are shown centrally located as a part of seal 16, it is understood that such members could be utilized and placed at other axial positions whereby the pipe would be prohibited from further movement in an axial direction. The pipe stop ring is preferably an upward bent projection 20 from flat metal stock or could be a spring biased ring. The seal 16 is positioned within housing 10 between axially spaced lip ring members 22 and 24. Each member includes an opening large enough to receive respective tubing ends 12 and 14.

Figure 4:
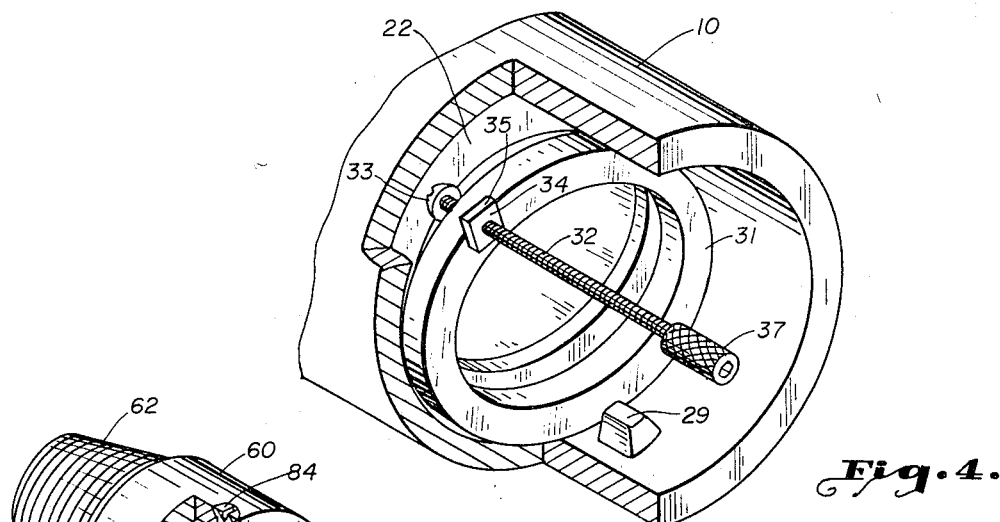
FIGURE 4 is a perspective partial end view of an additional embodiment of this invention.

Exteriorly of each lip ring member is a pipe holding ring 26. This ring has an exterior diameter slightly smaller than the inside diameter of said housing end 10. The interior diameter is slightly larger than the diameter of the tubing used. Each ring is positioned between a stop member 28 which may either be an adjustable member as shown or one which is cast into the housing as a lug 29 as shown in FIGURE 4. The ring includes on its side adjacent the lip ring a resiliently biased spring member such as a coil spring 30 which slideably abuts against the lip ring 22. An additional stop lug member 36, which may be a fixed lug or an adjustable one as shown, is positioned so as to be within the peripheral path of stop pin 38 which is affixed to the exterior side of pipe holding ring 26.

The assemblage includes as a possible additional embodiment a cover element 40 which, in cooperation with lugs 42 and 44 and bolt and nut assembly 46, retains housing 10 therewith.

In operation, housing 10 is adapted to be provided with a seal member 16 previously assembled which may or may not include the pipe stop members 18. Likewise previously assembled to the housing are the pipe holding rings 26 which are respectively positioned between the stop lugs 28. Because coil spring 30 acts to force the ring at that point outward from lip ring members 22 and 24, respectively, there is a lessening of the effective axial inner diameter of holding rings 26 which grip the tubing to wedge and lock the same. Accordingly, pipe 12 is caused to be inserted to the peripheral opening of pipe holding ring 26 and the opening of lip ring members 22 and 24 to a position substantially as shown or to a position in abutment against pipe stop member 18. Because of the resiliency of spring 30, the ring 26 is adapted to go inward allowing the pipe to move freely. Once the desired position is reached, by further pulling on the pipe there is respective locking of the inner periphery of the pipe holding ring 26 at its outer edges to effectively shorten the diameter thereof to permit a wedging action against the pipe on any further outward movement thereof. The same procedure is followed with regard to the other pipe 14 and in this position an effective sealed coupling is made between the two joints of pipe. In the alternative, a cover member 40 may be applied to the pipe and retained thereto by appropriate lugs and bolts and nut assemblies on each side thereof. When it is desired to remove tubing 12 and/or 14, the pipe is first rotated in its housing where upon such movement the pipe holding ring 26 is likewise adapted to move until stop pin 38 abuts the stop pin or lug 36 which is within the peripheral path. Once this position is reached, the pipe or tubing is then pulled in an outward direction therefrom and hence becomes released from the pipe holding ring 26. In actual operation, it has been found that in some instances the pipe is simultaneously rotated and pulled, maintaining the stop pin 38 against its lug 36 under rotative strain. These combinations of forces, both rotative and axial, upon the tubing act to cause the pipe holding ring 26 to assume a substantially perpendicular relationship to the tubing and hence permit its release therefrom.

The embodiment of FIGURE 4 includes a pipe holding ring 31 and a lug 29 to position the ring 31 adjacent lip ring 22. The pipe holding means is mechanically actuated by elongated screw 32, the head 33 of which extends inwardly between ring 31 and lip ring 22. A lock nut 34 is so positioned that one surface 35 abuts the interior periphery of housing 10 to prevent turning. Alternatively, the ring 31 could be threaded without the nut or in addition thereto. At the other end of screw 32 is a knob 37 to actuate the screw. In use, once a pipe end is inserted, the screw is turned by hand or allen wrench to cause head 33 to abut against lip ring 22 forcing the ring 31 to assume an angular position relative to the pipe. To release the pipe, the process is reversed. Suitable slots in the housing, not shown, are provided for the knob 37 or screw 32 as needed.

Figure 5:
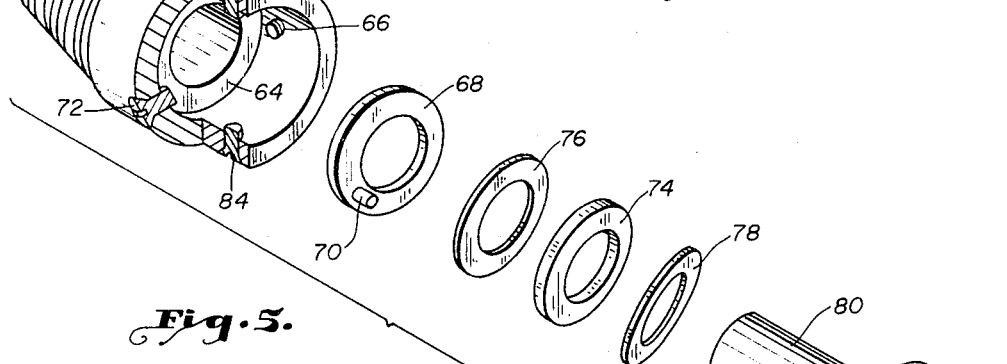
FIGURE 5 is an exploded view of an alternate embodiment of this invention incorporating the quick-action features thereof as specifically relative to the flexible hose connection.

Referring now to the embodiment of FIGURE 5, the hose coupling elements include a housing 60 which includes at one end means 62 for attachment and an axial opening therethrough. Lip ring 64 is provided adjacent the other end of housing 60 and includes a stop lug 66 positioned whereby a pipe holding ring 68 will be maintained between lip ring 64 and stop plug 66. The pipe holding ring includes a pin 70 on the outer side thereof and a spring, not shown, on the inner side. A stop lug 72 is likewise positioned on housing 60 on the outer side of holding rings 68 so as to be within the peripheral alignment of pin 70. In addition to these basic elements, a rubber gasket member 74 is sandwiched between metal washers 76 and 78 and which will extend exteriorly of the holding ring 68. The rubber gasket 74 has an interior opening which is slightly smaller than the diameter of hose connection pipe 80 while the outer diameter is slightly larger than the inner periphery of housing 60 to provide an effective seal thereto. An assembly holding ring 68 is positioned between lug 66 and stop lug 72 so as to be rotative therein as limited by the engagement of pin 70 against the stop lug 72. Following this, the washer assembly including gasket 74 and washers 76 and 78 is positioned upon the tubular portion 80 of the hose connection 82 leaving a portion of the pipe 80 exposed which is thereafter inserted into the housing 60 through holding ring 68 to a point wherein washer 78 abuts against stop lug 66. Additional holding members 84 are provided for retaining the gaskets and washer assemblies in position within the housing.

Figure 6:
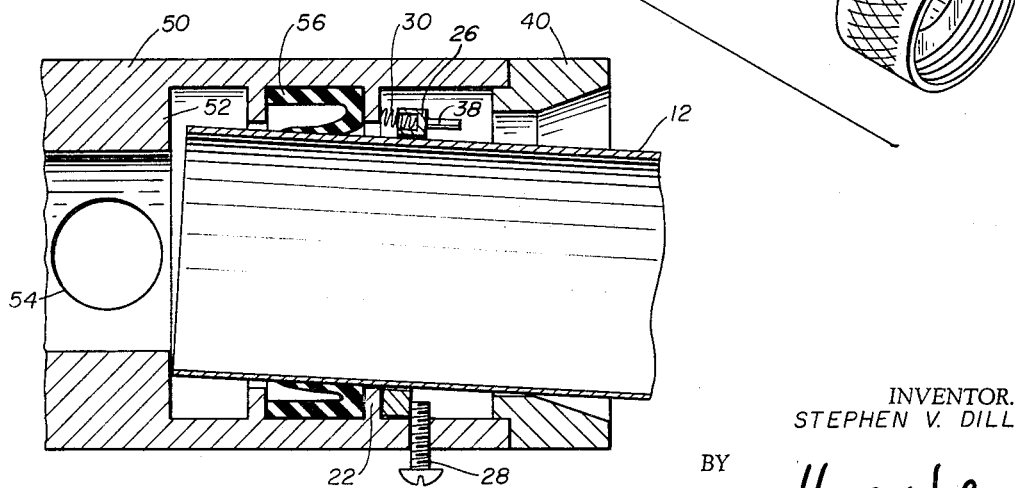
FIGURE 6 is a partial sectional view of one-half of an additional embodiment of this invention.

Referring now to FIGURE 6, an alternate embodiment is described relative to a housing or connector 50, one half of which is shown. Lugs 52 provide stop or limit means for tubing 12. An opening 54 is threaded or provided with other well known connection means for other tubing, or sprinkler heads as used in irrigation. A resilient seal gasket 56 operates to provide not only a mechanical but fluid pressure actuated seal to tubing 12. The remaining parts are identical to those previously described with like numbers referring to like or same parts.

The invention has been described with reference to specific and preferred embodiments. It will be apparent that other modifications can be made without departing from the spirit and scope of the invention. Accordingly, this invention should be construed not to be limited to the embodiments herein described but should be limited only by the scope of the appended claims.

What is claimed:
1. A pipe coupling comprising:
a cylindrical housing having an axial opening therethrough to receive abutting joints of pipe, said housing including axially spaced lip rings in the interior thereof;
a seal member between said lip rings with respective inwardly tapering end openings to sealingly receive said abutting joints of pipe;
pipe holding rings positioned within said housing respectively outside said lip rings, each ring having an inside diameter slightly larger than the outside diameter of said pipe, and each of said rings including an actuating member positioned on the inner side of said ring so as to slideably abut against said lip ring, in a first position whereby said ring is canted non-coaxially to said pipe to lessen the effective axial inside diameter and grip said pipe preventing removal thereof, and a stop actuating member located on the outer side of said holding ring nearly opposite said pin;
a first stop member positioned within said housing adjacent and outside each holding ring to retain said holding ring, at that point, adjacent said lip ring; and
a second stop member positioned within said housing slightly arcuately spaced from and in a transverse plane to said housing outside of said first stop member and within the rotatable path of said stop pin to abut therewith at a second position whereby said ring is caused to align substantially coaxially with said pipe to allow removal adjacent each holding ring to retain said holding ring, at that position, adjacent said lip ring.

2. A pipe coupling of the type described in claim 1 wherein said actuating member is compressibly biased to force said holding ring normally outward from said lip ring while in said first position.

3. A pipe coupling of the type described in claim 2 wherein said actuating member is a coil spring.

4. A pipe coupling of the type described in claim 1 wherein said seal member includes at least one pipe stop ring to limit the axial movement of said pipe within said housing.

5. A pipe coupling according to claim 1 wherein said extension member is threadably adjustable from said first position to said second position.

References Cited

UNITED STATES PATENTS

| 2,360,732 | 10/1944 | Smith | 285—340 |
| 2,805,873 | 9/1957 | Brennan | 285—340 X |
| 2,907,598 | 10/1959 | Hard | 287—58 |

FOREIGN PATENTS

| 557,701 | 5/1958 | Canada. |
| 1,403,312 | 5/1965 | France. |
| 239,992 | 9/1925 | Great Britain. |
| 568,304 | 3/1945 | Great Britain. |
| 6401728 | 8/1965 | Netherlands. |

CARL W. TOMLIN, *Primary Examiner.*

W. L. SHEDD, *Assistant Examiner.*